(12) United States Patent
Faitelson et al.

(10) Patent No.: US 9,870,480 B2
(45) Date of Patent: Jan. 16, 2018

(54) AUTOMATIC REMOVAL OF GLOBAL USER SECURITY GROUPS

(75) Inventors: Yakov Faitelson, Elkana (IL); Ohad Korkus, Herzilia (IL); Ophir Kretzer-Katzir, Reut (IL); David Bass, Carmei Yoseph (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

(21) Appl. No.: 12/861,059

(22) Filed: Aug. 23, 2010

(65) Prior Publication Data

US 2011/0296490 A1    Dec. 1, 2011

Related U.S. Application Data

(60) Provisional application No. 61/348,806, filed on May 27, 2010.

(51) Int. Cl.

| G06F 21/62 | (2013.01) |
| G06Q 10/10 | (2012.01) |
| H04L 29/06 | (2006.01) |

(52) U.S. Cl.
CPC ...... *G06F 21/6218* (2013.01); *G06F 21/6263* (2013.01); *G06Q 10/103* (2013.01);
(Continued)

(58) Field of Classification Search
USPC .......................................................... 726/1
See application file for complete search history.

(56) References Cited

U.S. PATENT DOCUMENTS

| 5,465,387 A | 11/1995 | Mukherjee |
| 5,889,952 A | 3/1999 | Hunnicutt et al. |

(Continued)

FOREIGN PATENT DOCUMENTS

CN    158889 A    3/2005

OTHER PUBLICATIONS

An International Search Report and a Written Opinion both dated Jun. 13, 2011 which issued during the prosecution of Applicant's PCT/IL11/00076.

(Continued)

*Primary Examiner* — Henry Tsang
(74) *Attorney, Agent, or Firm* — Ladas & Parry LLP

(57) ABSTRACT

A system for automatically replacing a user security group-based computer security policy by a computer security policy based at least partially on actual access, including a learned access permissions subsystem operative to learn current access permissions of users to network objects in an enterprise computer environment and to provide an indication of which users are members of which user security groups having access permissions to which network objects, a learned actual access subsystem operative to learn actual access history of users in the enterprise to the network objects and to provide indications of which users have had actual access to which network objects, and a computer security policy administration subsystem, receiving indications from the learned access permission subsystem and the learned actual access subsystem and being operative to automatically replace pre-selected user-security group-based access permissions with at least partially actual access-based access permissions without disrupting access to network objects.

18 Claims, 5 Drawing Sheets

(52) U.S. Cl.
CPC .... *H04L 63/105* (2013.01); *G06F 2221/2101* (2013.01); *G06F 2221/2141* (2013.01); *G06F 2221/2149* (2013.01)

(56) References Cited

U.S. PATENT DOCUMENTS

| | | | |
|---|---|---|---|
| 5,899,991 A | 5/1999 | Karch | |
| 6,308,173 B1* | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,403,925 B2 | 7/2008 | Schlesinger et al. | |
| 7,421,740 B2 | 9/2008 | Fey et al. | |
| 7,555,482 B2 | 6/2009 | Korkus | |
| 7,568,230 B2* | 7/2009 | Lieberman et al. | 726/23 |
| 7,606,801 B2 | 10/2009 | Faitelson et al. | |
| 7,716,240 B2 | 5/2010 | Lim | |
| 8,621,610 B2 | 12/2013 | Oberheide et al. | |
| 8,639,724 B1 | 1/2014 | Sorenson et al. | |
| 2002/0026592 A1* | 2/2002 | Gavrila et al. | 713/201 |
| 2003/0051026 A1 | 3/2003 | Carter et al. | |
| 2004/0186809 A1 | 9/2004 | Schlesinger et al. | |
| 2004/0249847 A1 | 12/2004 | Wang et al. | |
| 2004/0254919 A1 | 12/2004 | Giuseppini | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0203881 A1 | 9/2005 | Sakamoto et al. | |
| 2005/0246762 A1* | 11/2005 | Girouard et al. | 726/2 |
| 2005/0278334 A1 | 12/2005 | Fey et al. | |
| 2005/0278785 A1 | 12/2005 | Lieberman | |
| 2006/0064313 A1 | 3/2006 | Steinbarth et al. | |
| 2006/0075503 A1* | 4/2006 | Bunker et al. | 726/25 |
| 2006/0090208 A1* | 4/2006 | Smith | G06F 21/604 726/26 |
| 2006/0184459 A1 | 8/2006 | Parida | |
| 2006/0184530 A1 | 8/2006 | Song et al. | |
| 2006/0277184 A1* | 12/2006 | Faitelson et al. | 707/9 |
| 2006/0288050 A1* | 12/2006 | Wilson | 707/202 |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0156659 A1 | 7/2007 | Lim | |
| 2007/0156693 A1 | 7/2007 | Soin et al. | |
| 2007/0203872 A1 | 8/2007 | Flinn et al. | |
| 2007/0244899 A1* | 10/2007 | Faitelson et al. | 707/9 |
| 2007/0261121 A1 | 11/2007 | Jacobson | |
| 2007/0266006 A1 | 11/2007 | Buss | |
| 2007/0282855 A1 | 12/2007 | Chen et al. | |
| 2008/0031447 A1 | 2/2008 | Geshwind et al. | |
| 2008/0034402 A1 | 2/2008 | Botz et al. | |
| 2008/0172720 A1 | 7/2008 | Botz et al. | |
| 2008/0271157 A1 | 10/2008 | Faitelson et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0193015 A1* | 7/2009 | Jang | G06F 17/30867 |
| 2009/0265780 A1 | 10/2009 | Korkus et al. | |
| 2009/0320088 A1 | 12/2009 | Gill et al. | |
| 2010/0023491 A1 | 1/2010 | Huang et al. | |
| 2010/0070881 A1 | 3/2010 | Hanson et al. | |

OTHER PUBLICATIONS

USPTO OA dated Oct. 31, 2008 in connection with U.S. Appl. No. 11/635,736.
USPTO OA dated Aug. 1, 2008 in connection with U.S. Appl. No. 11/258,256.
USPTO OA dated Feb. 12, 2008 in connection with U.S. Appl. No. 11/258,256.
USPTO OA dated Dec. 14, 2010 in connection with U.S. Appl. No. 11/786,522.
USPTO OA dated Dec. 14, 2010 in connection with U.S. Appl. No. 11/789,884.
USPTO OA dated Jul. 9, 2010 in connection with U.S. Appl. No. 11/789,884.
International Search Report and a Written Opinion both dated May 20, 2010 issued during of PCT/IL10/00069.
Genunix; "Writing Filesystems-VFS and Vnode interfaces", 5 pages, Oct. 2007.
S.R. Kleiman; "Vnodes: An Architecture for Multiple File System Types in Sun UNIX", USENIX Association: Summer Conference Proceedings, Atlanta 1986, pp. 1-10.
Findutils—GNU Project—Free Software Foundation (FSF), 3 pages, Nov. 2006, 3 pages.
Sahadeb De, et al; "Secure Access Control in a Multi-user Geodatabase", available on the Internet at the URL http://www10.giscafe.com.2005.
Sara C. Madeira, et al; "Biclustering Algorithms for Biological Data Analysis; A Survey", Mar. 2004; http://www.cs.princeton.edu/courses/archive/spr05/cos598E/bib/bicluster.pdf.
Sara C. Madeira; "Clustering, Fuzzy Clustering and Biclustering: An Overview", pp. 31-53, Jun. 27, 2003.
USPTO NFOA dated Sep. 14, 2012 in connection with U.S. Appl. No. 12/861,967.
International Search Report and Written Opinion both dated Apr. 13, 2012 which issued during the prosecution of Applicant's PCT/IL11/00902.
An International Preliminary Report on Patentability dated Jul. 30, 2013, which issued during the prosecution of Applicant's PCT/IL2011/000902.
An Office Action dated Mar. 25, 2015, which issued during the prosecution of U.S. Appl. No. 13/384,452.
"It is the best to use everyone group when setting administrator security authority", Computer and Network, vol. 2010, No. 2, p. 41, Feb. 2010.
Notification of The First Chinese Office Action dated Apr. 22, 2015; Appln. No. 2011800362789.
U.S. Appl. No. 61/240,726, filed Sep. 9, 2009.
U.S. Appl. No. 61/348,806, filed May 27, 2010.
U.S. Appl. No. 12/673,691, filed Jan. 27, 2010.

* cited by examiner

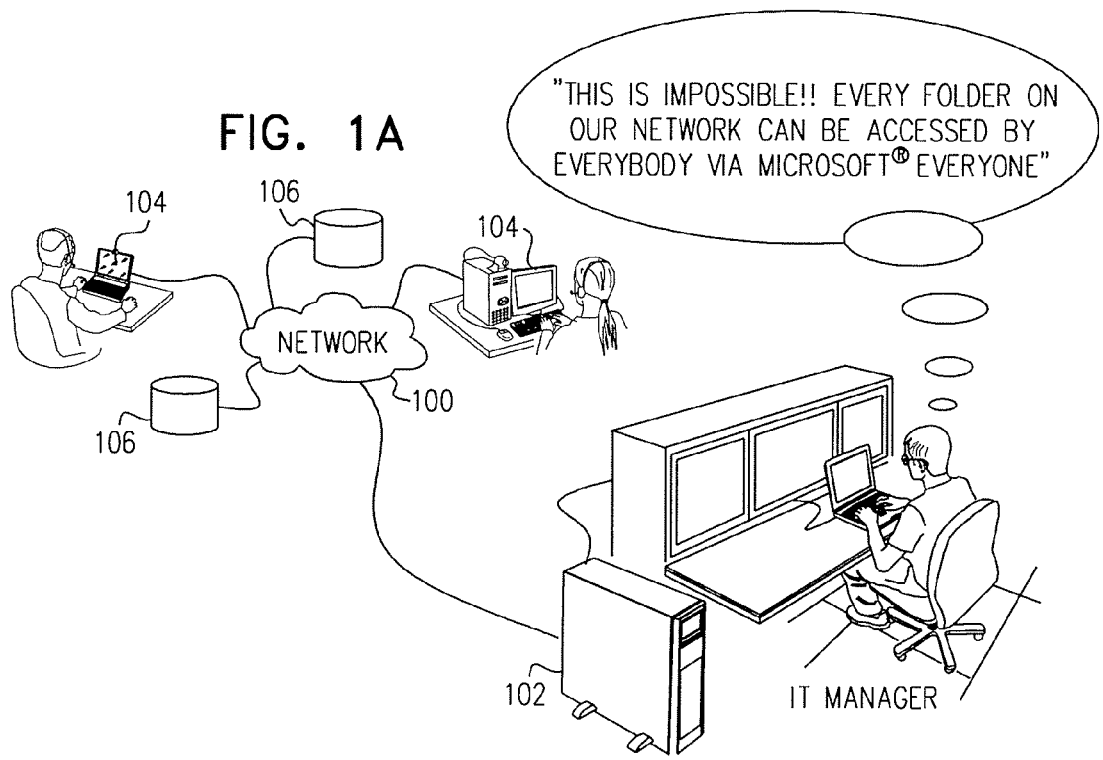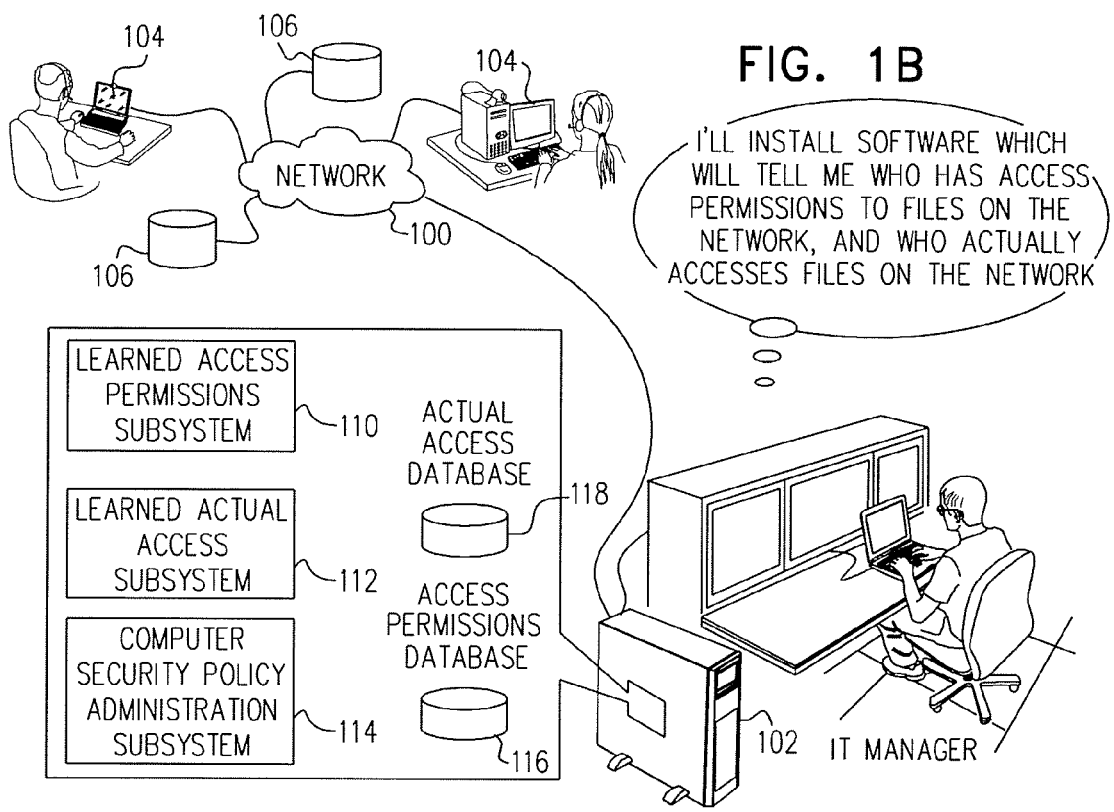

AUTOMATIC REMOVAL OF GLOBAL USER SECURITY GROUPS

REFERENCE TO RELATED APPLICATIONS AND PATENTS

Reference is made to U.S. Provisional Patent Application Ser. No. 61/348,806, filed May 27, 2010 and entitled "AUTOMATING ENFORCEMENT OF IT WORK-FLOWS", the disclosure of which is hereby incorporated by reference and priority of which is hereby claimed pursuant to 37 CFR 1.78(a) (4) and (5)(i).

Reference is also made to the following patents and patent applications, owned by assignee, the disclosures of which are hereby incorporated by reference:

U.S. Pat. Nos. 7,555,482 and 7,606,801; and

U.S. Published Patent Application Nos. 2007/0244899, 2008/0271157, 2009/0100058, 2009/0119298 and 2009/0265780.

FIELD OF THE INVENTION

The present invention relates to data management systems and methodologies generally and more particularly to data access permission management systems and methodologies.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482 and 7,606,801; and U.S. Published Patent Application Nos.: 2003/0051026; 2004/0249847; 2005/0108206; 2005/0203881; 2005/0120054; 2005/0086529; 2006/0064313; 2006/0184530; 2006/0184459 and 2007/0203872.

SUMMARY OF THE INVENTION

The present invention seeks to provide improved data access permission management systems and methodologies. There is thus provided in accordance with a preferred embodiment of the present invention an enterprise system for automatically replacing a user security group-based computer security policy by a computer security policy based at least partially on actual access, the system including a learned access permissions subsystem operative to learn the current access permissions of users in the enterprise to network objects in an enterprise computer environment and to provide an indication of which users are members of which user security groups having access permissions to which network objects, a learned actual access subsystem operative to learn the actual access history of the users in the enterprise to the network objects and to provide an indication of which users have had actual access to which network objects, and a computer security policy administration subsystem, receiving the indications from the learned access permission subsystem and the learned actual access subsystem and being operative to automatically replace pre-selected user-security group-based access permissions with at least partially actual access based access permissions without disrupting user access to the network objects.

In accordance with a preferred embodiment of the present invention, the computer security policy administration subsystem includes replacement initiation functionality which automatically initiates automatic replacement of pre-selected user-security group-based access permissions with at least partially actual access based accessed permissions based on a schedule predetermined by a human administrator.

Preferably, the system also includes a pre-replacement notification and authorization subsystem automatically operative prior to execution of the replacement to notify predetermined stakeholders in predetermined ones of the network objects of changes in access permissions expected to take place as the result of the replacement, to request their authorization and in the absence of the authorization to prevent execution of the replacement in respect of at least some of the network objects and at least some of the users for which authorization was not received. Preferably, the user security group is MICROSOFT® EVERYONE GROUP.

Additionally, the computer security policy administration subsystem is operative to automatically replace pre-selected user-security group-based access permissions with access permissions partially based on actual access and partially based on pre-existing access permissions which are not the pre-selected user-security group-based access permissions. Alternatively, the computer security policy administration subsystem is operative to automatically replace pre-selected user-security group-based access permissions with access permissions at least partially based on actual access and at least partially based on similarity of actual access profiles of users to users having had actual access. Alternatively, the computer security policy administration subsystem is operative to automatically replace pre-selected user-security group-based access permissions with access permissions based on pre-existing access permissions which are not the pre-selected user-security group-based access permissions.

Preferably, the computer security policy administration subsystem includes simulation initiation functionality which automatically initiates simulation of replacement of pre-selected user-security group-based access permissions with at least partially actual access based accessed permissions based on a schedule predetermined by a human administrator.

There is also provided in accordance with another preferred embodiment of the present invention an enterprise system for simulating replacement of a user security group-based computer security policy by a computer security policy, the system including a learned access permission subsystem operative to learn the current access permissions of users in the enterprise to network objects in an enterprise computer environment and to provide an indication of which users are members of which user security groups having access permissions to which network objects, a learned actual access subsystem operative to learn the actual access history of the users in the enterprise to the network objects and to provide an indication of which users have had actual access to which network objects, and a computer security policy simulation subsystem, receiving the indications from the learned access permission subsystem and the learned actual access subsystems and being operative to automatically simulate replacement of pre-selected user-security group-based access permissions with at least partially actual access based accessed permissions without disrupting user access to the network objects.

In accordance with a preferred embodiment of the present invention, the system also includes a pre-replacement notification and authorization subsystem automatically operative to notify predetermined stakeholders in predetermined ones of the network objects of changes in access permissions expected to take place as the result of the replacement, to request their authorization. Preferably, the user security group is the MICROSOFT® EVERYONE GROUP.

There is further provided in accordance with yet another preferred embodiment of the present invention a method for automatically replacing a user security group-based computer security policy by a computer security policy based at least partially on actual access, the method including learning the current access permissions of users in the enterprise to network objects in an enterprise computer environment and to provide an indication of which users are members of which user security groups having access permissions to which network objects, learning the actual access history of the users in the enterprise to the network objects and to provide an indication of which users have had actual access to which network objects, and receiving the indications and automatically replacing pre-selected user-security group-based access permissions with at least partially actual access based access permissions without disrupting user access to the network objects.

In accordance with a preferred embodiment of the present invention, the method includes automatically initiating automatic replacement of pre-selected user-security group-based access permissions with at least partially actual access based accessed permissions based on a schedule predetermined by a human administrator.

Preferably, the method also includes prior to execution of the replacement to notify predetermined stakeholders in predetermined ones of the network objects of changes in access permissions expected to take place as the result of the replacement, to request their authorization and in the absence of the authorization to prevent execution of the replacement in respect of at least some of the network objects and at least some of the users for which authorization was not received. Preferably, the user security group is MICROSOFT® EVERYONE GROUP.

Additionally, the method includes automatically replacing pre-selected user-security group-based access permissions with access permissions partially based on actual access and partially based on pre-existing access permissions which are not the pre-selected user-security group-based access permissions. Alternatively, the method includes automatically replacing pre-selected user-security group-based access permissions with access permissions at least partially based on actual access and at least partially based on similarity of actual access profiles of users to users having had actual access. Alternatively, the method includes automatically replacing pre-selected user-security group-based access permissions with access permissions based on pre-existing access permissions which are not the pre-selected user-security group-based access permissions.

Preferably, the method includes automatically initiating simulation of replacement of pre-selected user-security group-based access permissions with at least partially actual access based accessed permissions based on a schedule predetermined by a human administrator.

There is yet further provided in accordance with still another preferred embodiment of the present invention a method for simulating replacement of a user security group-based computer security policy by a computer security policy, the method including learning the current access permissions of users in the enterprise to network objects in an enterprise computer environment and to provide an indication of which users are members of which user security groups having access permissions to which network objects, learning the actual access history of the users in the enterprise to the network objects and to provide an indication of which users have had actual access to which network objects, and receiving the indications and automatically simulating replacement of pre-selected user-security group-based access permissions with at least partially actual access based accessed permissions without disrupting user access to the network objects.

In accordance with a preferred embodiment of the present invention, the method also includes notifying predetermined stakeholders in predetermined ones of the network objects of changes in access permissions expected to take place as the result of the replacement, to request their authorization. Preferably, the user security group is the MICROSOFT® EVERYONE GROUP.

BRIEF DESCRIPTION OF THE DRAWINGS

The present invention will be understood and appreciated more fully from the following detailed description, taken in conjunction with the drawings in which:

FIGS. 1A, 1B, 1C, 1D, and 1E are simplified pictorial illustrations of operation of an enterprise system for automatically replacing a user security group-based computer security policy by a computer security policy based at least partially on actual access, constructed and operative in accordance with a preferred embodiment of the present invention.

DETAILED DESCRIPTION OF PREFERRED EMBODIMENTS

Figure 1C:
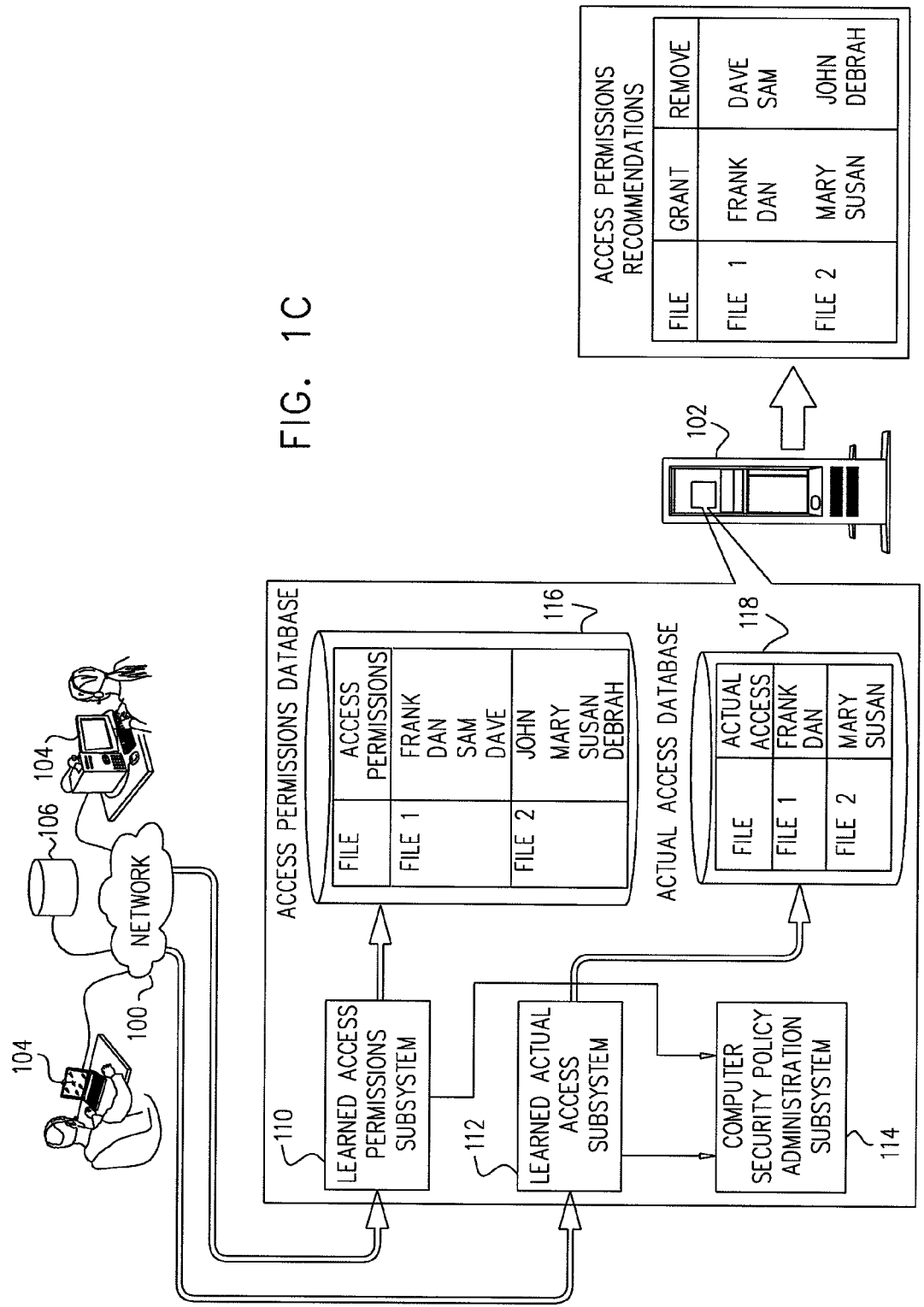

Reference is now made to FIGS. 1A, 1B, 1C, 1D and 1E, which are simplified pictorial illustrations of operation of an enterprise system for automatically replacing a user security group-based computer security policy by a computer security policy based at least partially on actual access, constructed and operative in accordance with a preferred embodiment of the present invention.

As seen generally in FIGS. 1A-1E, the network object access permission management system is useful with a computer network 100 including at least one server 102 and a multiplicity of clients 104. One or more storage devices 106 are also preferably provided. The system preferably resides on at least one server 102 and preferably includes:

a learned access permissions subsystem 110 operative to learn the current access permissions of users in the enterprise to network objects residing in the enterprise computer environment and to provide an indication of which users are members of which user security groups having access permissions to which network objects;

a learned actual access subsystem 112 operative to learn the actual access history of the users in the enterprise to the network objects and to provide an indication of which users have had actual access to which network objects; and a computer security policy administration subsystem 114, receiving the indications from the learned access permission subsystem 110 and the learned actual access subsystem 112 and being operative to automatically replace pre-selected user-security group-based access permissions with at least partially actual access based access permissions without disrupting user access to the network objects.

The term "network object" for the purposes of this application is defined to include user generated enterprise computer network resources on any commercially available computer operating system. Examples of network objects include structured and unstructured computer data resources such as files and folders, and user groups.

Turning now to FIG. 1A, it is seen that an IT manager realizes, to his dismay, that some or all of the network objects in his network can be accessed by all or nearly all of the users in the enterprise, all of whom are members of the MICROSOFT® EVERYONE GROUP. It is appreciated that the MICROSOFT® EVERYONE GROUP does not contain an explicit or searchable list of all of the members thereof.

As shown in FIG. 1B, the IT manager installs the network object access permission management system of the present invention which, in addition to the elements described hereinabove, also preferably includes an access permissions database 116 and an actual access database 118. It is appreciated that subsystems 110 and 112 as well as databases 116 and 118 are commercially available as part of the DATADVANTAGE® product of Varonis Inc. of New York, N.Y.

FIG. 1C shows automatic population of databases 116 and 118 through operation of subsystems 110 and 112 during a learning period, typically extending over a few weeks. This process is described in Applicant/Assignees U.S. Pat. No. 7,606,801. FIG. 1C also shows automatic operation of the computer security policy administration subsystem 114, receiving the indications from the learned access permission subsystem 110 and the learned actual access subsystem 112 and automatically generating recommendations for replacing pre-selected user-security group-based access permissions with at least partially actual access based access permissions, subject to operator confirmation.

Figure 1D:
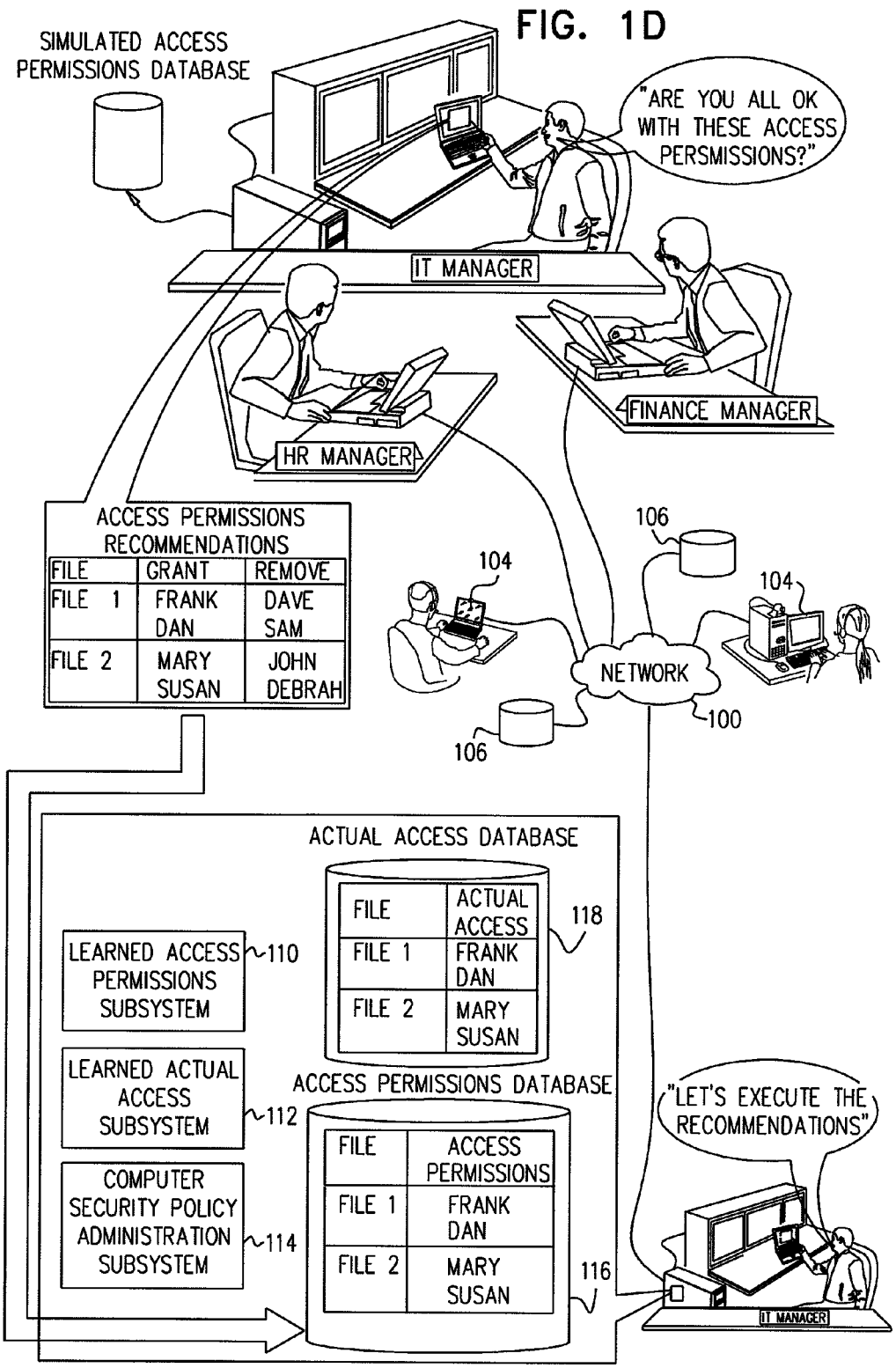

As seen in FIG. 1D, the IT manager, alone or possible in consultation with an HR manager or other executive decides whether or not to approve the automatically generated recommendations. If the automatically generated recommendations are approved, they are implemented automatically without disrupting needed user access to the network objects residing in the enterprise computer environment.

Figure 1E:
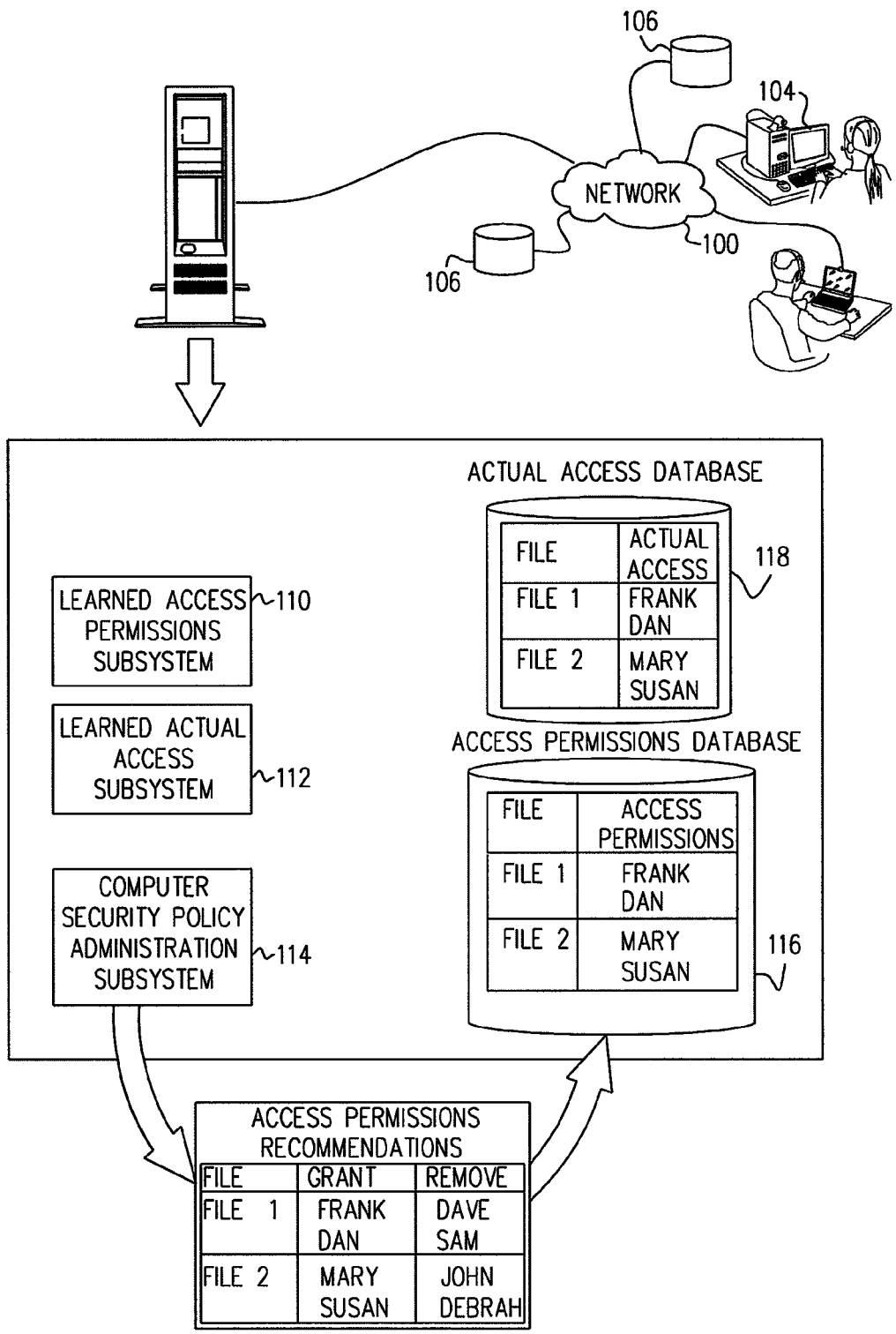

Alternatively, as seen in FIG. 1E, subsystem 114 can instead automatically replace pre-selected user-security group-based access permissions with at least partially actual access-based access permissions, also without disrupting needed user access to the network objects residing in the enterprise computer environment.

Figure 2:
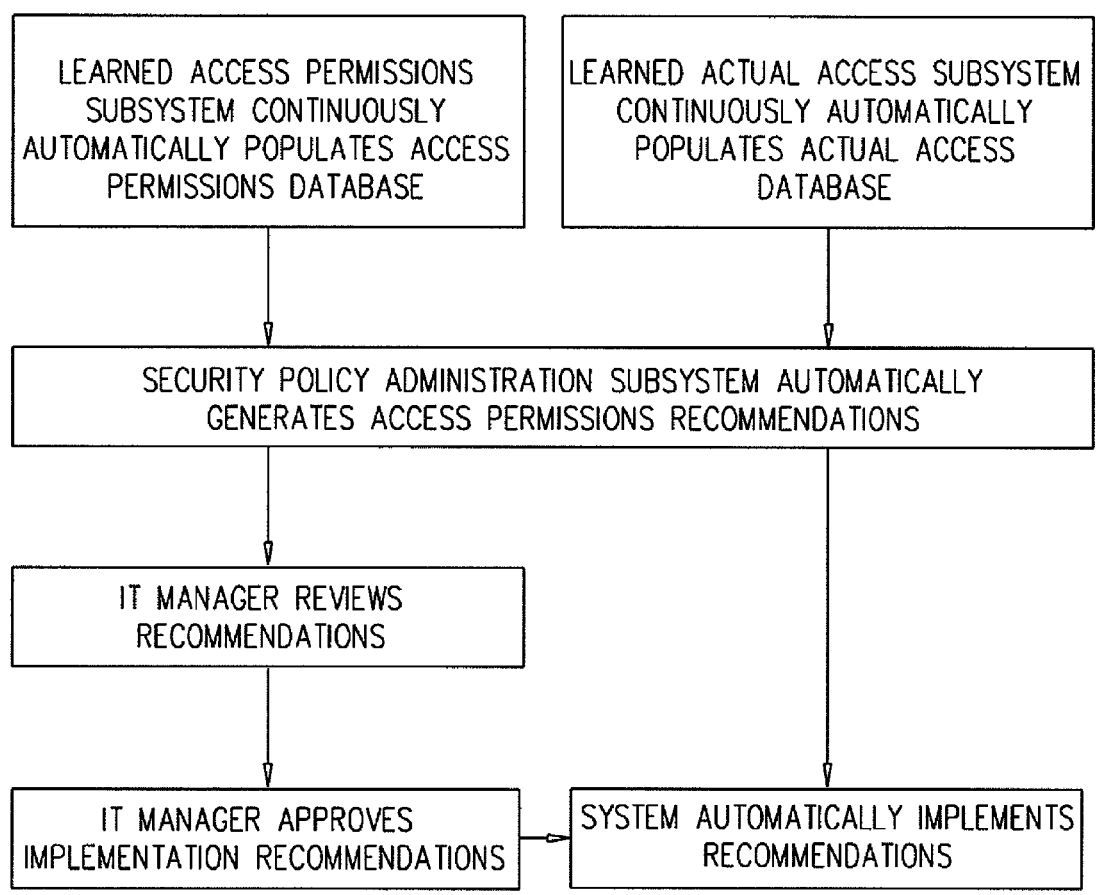
FIG. 2 is a simplified flowchart indicating steps in the operation of the system of FIG. 1.

Reference is now made to FIG. 2, which is a simplified flowchart indicating steps in the operation of the system of FIG. 1. As shown in FIG. 2, the learned access permissions subsystem continuously automatically populates the access permissions database with the current access permissions of users in the enterprise to network objects residing in the enterprise computer environment. In parallel, the learned actual access subsystem continuously automatically populates the actual access database with the actual access history of the users in the enterprise to the network objects.

As shown in FIG. 2, the security policy administration subsystem automatically generates access permissions recommendations based on information provided by the access permissions subsystem and from the actual access subsystem. The IT manager reviews the recommendations and decides whether to approve them for automatic implementation by the security policy administration subsystem. Alternatively, the security policy administration subsystem may automatically implement the recommendations.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An enterprise system for automatically replacing a user security group-based computer security policy by a computer security policy based at least partially on actual access, said system comprising:
    a learned access permissions subsystem comprising at least one processor and at least one memory comprising computer code, said learned access permissions subsystem operative to learn current access permissions of users in an enterprise to network objects in an enterprise computer environment and to provide an indication of which users are members of which user security groups having access permissions to which network objects;
    a learned actual access subsystem comprising at least one processor and at least one memory comprising computer code, said learned actual access subsystem operative to learn an actual access history of said users in the enterprise to said network objects and to provide an indication of which users have had actual access to which network objects; and
    a computer security policy administration subsystem comprising at least one processor and at least one memory comprising computer code, said computer security policy administration subsystem operable for receiving said indications from said learned access permission subsystem and said learned actual access subsystem and being operative to automatically replace access permissions of a pre-selected user security group to said network objects by:
        automatically removing all access permissions of said pre-selected user security group to said network objects, regardless of whether members of said pre-selected user security group have actually accessed said network objects; and
        automatically providing access permissions to said network objects to automatically identified users of said network objects who earlier had actual access to said network objects, which access permissions were automatically removed in said automatically removing all access permissions step,
    said computer security policy administration subsystem also comprising replacement initiation functionality which automatically initiates said replacement of said access permissions of said pre-selected user security group to said network objects based only on a schedule predetermined by an administrator.

2. An enterprise system for automatically replacing a user security group-based computer security policy by a computer security policy based at least partially on actual access according to claim 1 and also comprising:
    a pre-replacement notification and authorization subsystem comprising at least one processor and at least one memory comprising computer code, said pre-replacement notification and authorization subsystem automatically operative prior to execution of said replacement to notify predetermined stakeholders in predetermined ones of said network objects of changes in access permissions expected to take place as a result of said replacement, to request their authorization and in an absence of said authorization to prevent execution of said replacement in respect of at least some of said network objects and at least some of said users in the enterprise for which authorization was not received.

3. An enterprise system for automatically replacing a user security group-based computer security policy by a computer security policy based at least partially on actual access according to claim 1 and wherein said pre-selected user security group comprises all users of said enterprise computer environment.

4. An enterprise system for automatically replacing a user security group-based computer security policy by a computer security policy based at least partially on actual access according to claim 1 and wherein said computer security policy administration subsystem is operative to automatically replace said access permissions of said pre-selected user security group with access permissions partially based on actual access of said users in the enterprise and partially based on pre-existing access permissions which are not said access permissions of said pre-selected user security group.

5. An enterprise system for automatically replacing a user security group-based computer security policy by a computer security policy based at least partially on actual access according to claim 1 and wherein said computer security policy administration subsystem is operative to automatically replace said access permissions of said pre-selected user security group with access permissions at least partially based on actual access of said users in the enterprise and at least partially based on similarity of actual access profiles of said users in the enterprise having had actual access.

6. An enterprise system for automatically replacing a user security group-based computer security policy by a computer security policy based at least partially on actual access according to claim 1 and wherein said computer security policy administration subsystem is operative to automatically replace said access permissions of said pre-selected user security group with access permissions based on pre-existing access permissions which are not said access permissions of said pre-selected user security group.

7. An enterprise system for automatically replacing a user security group-based computer security policy by a computer security policy based at least partially on actual access according to claim 1 and wherein said computer security policy administration subsystem includes simulation initiation functionality which automatically initiates simulation of said replacement of said access permissions of said pre-selected user security group with access permissions which are at least partially based on actual access of said users in the enterprise, based on said schedule predetermined by said administrator.

8. An enterprise system for simulating replacement of a user security group-based computer security policy by a computer security policy, said system comprising:
a learned access permission subsystem comprising at least one processor and at least one memory comprising computer code, said learned access permissions subsystem operative to learn current access permissions of users in an enterprise to network objects in an enterprise computer environment and to provide an indication of which users are members of which user security groups having access permissions to which network objects;
a learned actual access subsystem comprising at least one processor and at least one memory comprising computer code, said learned actual access subsystem operative to learn an actual access history of said users in the enterprise to said network objects and to provide an indication of which users have had actual access to which network objects;
a computer security policy simulation subsystem comprising at least one processor and at least one memory comprising computer code, said computer security policy administration subsystem being operable for receiving said indications from said learned access permission subsystem and said learned actual access subsystem and being operative to automatically simulate replacing access permissions of a pre-selected user security group to said network objects by:
automatically simulating removal of all access permissions of said pre-selected user security group to said network objects regardless of whether members of said pre-selected user security group have actually accessed said network objects; and
automatically simulating providing access permissions to said network objects to automatically identified users of said network objects who earlier had actual access to said network objects, which access permissions were automatically removed in said automatically simulating removing all access permissions step;
a pre-replacement notification and authorization subsystem comprising at least one processor and at least one memory comprising computer code, said pre-replacement notification and authorization subsystem automatically operative to notify predetermined stakeholders in predetermined ones of the network objects of changes in access permissions expected to take place as a result of the replacement, to request their authorization; and
said computer security policy administration subsystem also comprising replacement initiation functionality which, responsive to said authorization, automatically initiates said replacement of said access permissions of said pre-selected user security group to said network objects based only on a schedule predetermined by an administrator.

9. An enterprise system for simulating replacement of a user security group-based computer security policy by a computer security policy according to claim 8 and wherein said pre-selected user security group comprises all users of said enterprise computer environment.

10. A method for automatically replacing a user security group-based computer security policy by a computer security policy based at least partially on actual access, said method comprising using at least one processor to execute computer code stored in at least one memory for:
learning current access permissions of users in an enterprise to network objects in an enterprise computer environment and to provide an indication of which users are members of which user security groups having access permissions to which network objects;
learning an actual access history of said users in the enterprise to said network objects and to provide an indication of which users have had actual access to which network objects;
receiving said indications and automatically replacing access permissions of a pre-selected user security group to said network objects by:
automatically removing all access permissions of said pre-selected user security group to said network objects, regardless of whether members of said pre-selected user security group have actually accessed said network objects; and
automatically providing access permissions to said network objects to automatically identified users of said network objects who earlier had actual access to said network objects, which access permissions were automatically removed in said automatically removing all access permissions step; and automatically initiating said replacement of said access permissions of said pre-selected user security group to said network objects based only on a schedule predetermined by an administrator.

11. A method for automatically replacing a user security group-based computer security policy by a computer security policy based at least partially on actual access according to claim 10 and wherein said method also comprises using said at least one processor and said at least one memory comprising computer code for:

notifying, prior to execution of said replacement, predetermined stakeholders in predetermined ones of said network objects of changes in access permissions expected to take place as a result of said replacement, to request their authorization and in an absence of said authorization to prevent execution of said replacement in respect of at least some of said network objects and at least some of said users in the enterprise for which authorization was not received.

12. A method for automatically replacing a user security group-based computer security policy by a computer security policy based at least partially on actual access according to claim 10 and wherein said pre-selected user security group comprises all users of said enterprise computer environment.

13. A method for automatically replacing a user security group-based computer security policy by a computer security policy based at least partially on actual access according to claim 10 and wherein said method also comprises using said at least one processor and said at least one memory comprising computer code for automatically replacing said access permissions of said pre-selected user security group with access permissions partially based on actual access of said users in the enterprise and partially based on pre-existing access permissions which are not said access permissions of said pre-selected user security group.

14. A method for automatically replacing a user security group-based computer security policy by a computer security policy based at least partially on actual access according to claim 10 and wherein said method also comprises using said at least one processor and said at least one memory comprising computer code for automatically replacing said access permissions of said pre-selected user security group with access permissions at least partially based on actual access of said users in the enterprise and at least partially based on similarity of actual access profiles of said users in the enterprise having had actual access.

15. A method for automatically replacing a user security group-based computer security policy by a computer security policy based at least partially on actual access according to claim 10 and wherein said method also comprises using said at least one processor and said at least one memory comprising computer code for automatically replacing said access permissions of said pre-selected user security group with access permissions based on pre-existing access permissions which are not said access permissions of said pre-selected user security group.

16. A method for automatically replacing a user security group-based computer security policy by a computer security policy based at least partially on actual access according to claim 10 and wherein said method also comprises using said at least one processor and said at least one memory comprising computer code for automatically initiating simulation of said replacement of said access permissions of said pre-selected user security group with access permissions which are at least partially based on actual access of said users in the enterprise, based on said schedule predetermined by said administrator.

17. A method for simulating replacement of a user security group-based computer security policy by a computer security policy, said method comprising using at least one processor to execute computer code stored in at least one memory for:

learning current access permissions of users in an enterprise to network objects in an enterprise computer environment and to provide an indication of which users are members of which user security groups having access permissions to which network objects;

learning an actual access history of said users in the enterprise to said network objects and to provide an indication of which users have had actual access to which network objects;

receiving said indications and automatically simulating replacing access permissions of a pre-selected user security group to said network objects by:

automatically simulating removal of all access permissions of said pre-selected user security group to said network objects regardless of whether members of said pre-selected user security group have actually accessed said network objects; and automatically simulating providing access permissions to said network objects to automatically identified users of said network objects who earlier had actual access to said network objects, which access permissions were automatically removed in said automatically simulating removing all access permissions step;

notifying predetermined stakeholders in predetermined ones of said network objects of changes in access permissions expected to take place as a result of said replacement, to request their authorization; and responsive to said authorization, automatically initiating said replacement of said access permissions of said pre-selected user security group to said network objects based only on a schedule predetermined by an administrator.

18. A method for simulating replacement of a user security group-based computer security policy by a computer security policy according to claim 17 and wherein said pre-selected user security group comprises all users of said enterprise computer environment.

* * * * *